United States Patent [19]

Sugawara

[11] Patent Number: 5,923,806
[45] Date of Patent: Jul. 13, 1999

[54] FIBER OPTICS DEVICE

[75] Inventor: Takeo Sugawara, Hamamatsu, Japan

[73] Assignee: Hamamatsu Photonics K.K., Hamamatsu, Japan

[21] Appl. No.: 08/838,048

[22] Filed: Apr. 22, 1997

[30] Foreign Application Priority Data

Apr. 22, 1996 [JP] Japan .................................. 8-100156

[51] Int. Cl.⁶ ........................................................ G02B 6/04
[52] U.S. Cl. ............................................ 385/121; 385/120
[58] Field of Search ...................................... 385/121, 120, 385/116, 117, 115, 119

[56] References Cited

U.S. PATENT DOCUMENTS

| 2,992,587 | 7/1961 | Hicks, Jr. et al. | 385/121 |
| 3,402,000 | 9/1968 | Crawford | 350/96 |
| 3,586,895 | 6/1971 | Sowers | 385/116 |
| 3,874,783 | 4/1975 | Cole | 385/115 |
| 3,906,520 | 9/1975 | Phillips | 354/62 |
| 3,907,403 | 9/1975 | Maeda | 385/120 |
| 4,139,261 | 2/1979 | Hilsum | 359/746 |
| 4,184,738 | 1/1980 | Wright | 385/8 |
| 4,198,117 | 4/1980 | Kobayashi | 385/116 |
| 4,647,152 | 3/1987 | Jeskey | 385/116 |
| 4,871,228 | 10/1989 | Roos | 385/116 |
| 4,932,776 | 6/1990 | Dowling, Jr. et al. | 356/71 |
| 5,426,296 | 6/1995 | Shikai et al. | 250/227.2 |
| 5,455,882 | 10/1995 | Veligdan | 385/116 |
| 5,502,457 | 3/1996 | Sakai et al. | 345/87 |

FOREIGN PATENT DOCUMENTS

| 0 747 737 | 12/1996 | European Pat. Off. . |
| 7-174947 | 7/1995 | Japan . |

Primary Examiner—Rodney Bovernick
Assistant Examiner—Ellen E. Kang
Attorney, Agent, or Firm—Pillsbury Madison & Sutro LLP

[57] ABSTRACT

A fiber optics device of this invention includes first and second assemblies. The first assembly is obtained by integrating a plurality of optical fibers by bundling, and has first and second end faces formed obliquely to the optical axis of the optical fibers contained in it. The second end face has small recesses and projections to scatter light emerging from it. The second assembly is obtained by integrating a plurality of optical fibers by bundling, and has first and second end faces substantially intersecting perpendicularly to the optical axis of the optical fibers contained in it. The first end face of the second assembly is bonded to the second end face of the first assembly. As a result, an optical loss occurring at the bonding portion between the assemblies can be decreased.

9 Claims, 5 Drawing Sheets

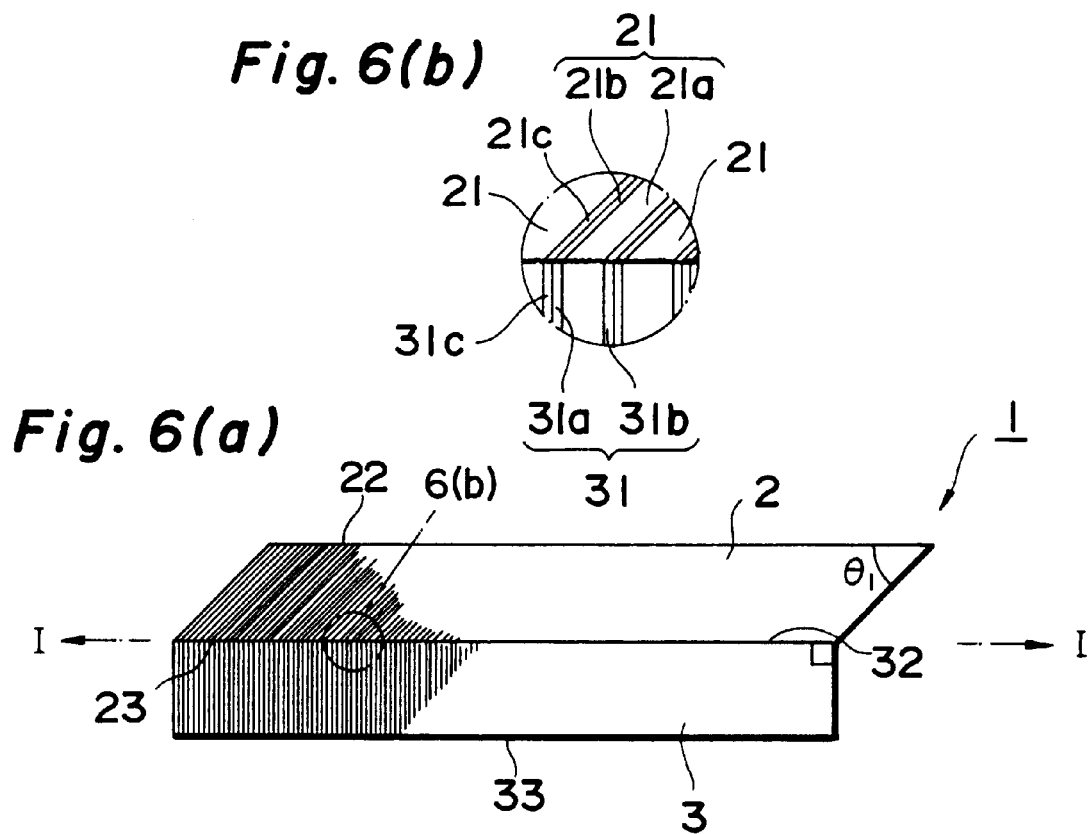
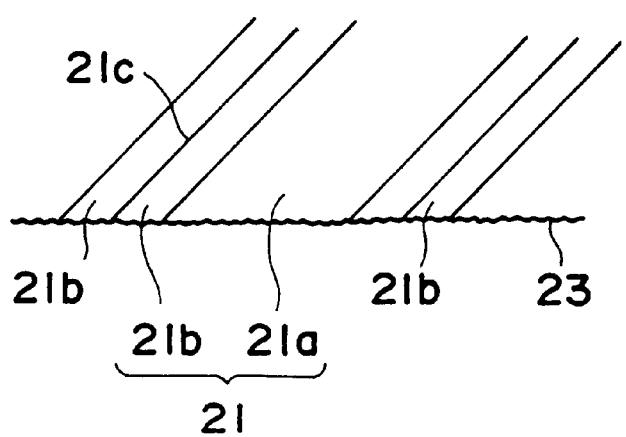
Fig. 7

FIBER OPTICS DEVICE

BACKGROUND OF THE INVENTION

1. Field of the Invention

The present invention relates to a fiber optics device obtained by bonding a plurality of optical assemblies, each having bundled optical fibers and a predetermined image trasmitting direction and the image transmitting directions of them are different from each other.

2. Related Background Art

A fiber optics assembly in which a large number of optical fibers are integrated by bundling is used as an optical image transmitting means. In such a fiber optics assembly, the incident and exit directions of an image to be transmitted must sometimes be different from each other depending on applications. In this case, fiber optics assemblies having different image transmitting directions (fiber optics assemblies in which the optical fibers of the constituent elements have different image transmitting directions) may be bonded to each other. However, an optical loss occurs in the bonding portion, and accordingly it is not easy to transmit an image efficiently.

As a device obtained by bonding two optical assemblies, the optical fibers of which have different optical axes, one described in U.S. Pat. No. 3,402,000 is known. U.S. Pat. No. 3,402,000 discloses an assembly as shown in FIG. 1, in which a first assembly A having an exit surface inclined with respect to the direction of an optical axis of the optical fibers and a second assembly B having an incident surface perpendicular to the direction of the optical axis of the optical fibers are optically bonded to each other. A third assembly E is interposed between an exit surface C of the first assembly A and an incident surface D of the second assembly B to improve the optical transmitting characteristics from the first assembly A to the second assembly B. This reference also discloses an assembly as shown in FIG. 2, in which the end faces of optical fibers exposed to an exit surface C of a first assembly A are cut in the same direction to form the exit surface C as a saw-toothed three-dimensional surface, so that the optical transmitting characteristics from the first assembly A to a second assembly B are improved. This reference also discloses an assembly as shown in FIGS. 3 and 4, in which a assembly F having a surface formed with a large number of V-shaped grooves is interposed between an exit surface C of a first assembly A and an incident surface D of a second assembly B to improve the optical transmitting characteristics from the first assembly A to the second assembly B.

SUMMARY OF THE INVENTION

It is an object of the present invention to provide a fiber optics device capable of decreasing the optical loss occurring at the bonding portion of assemblies and having good image transmitting characteristics.

According to the present invention, there is provided a fiber optics device comprising: a first assembly obtained by integrating a plurality of optical fibers by bundling, the first assembly having a first end face obliquely intersecting an image transmitting direction and a second end face obliquely intersecting the image transmitting direction, and the second end face of the first assembly being entirely formed with recesses and projections, a pitch of the recesses and projections and a height of the projections from the recesses being smaller than a diameter of each of the optical fibers of the first assembly; and a second assembly obtained by integrating a plurality of optical fibers by bundling, the second assembly having a first end face substantially intersecting perpendicularly to the image transmitting direction and a second end face substantially intersecting perpendicularly to the image transmitting direction, and the first end face of the second assembly being bonded to the second end face of the first assembly.

According to the present invention, light incident on the first assembly and emerging from the first end face becomes efficiently incident on the second assembly. As a result, an optical loss occurring at the bonding portion between the first and second assemblies can be decreased.

In the fiber optics device of the present invention, the first end face of the first assembly can be formed substantially parallel to the second end face of the first assembly.

In the fiber optics device of the present invention, the pitch of the recesses and projections of the second end face of the first assembly is preferably 1/X1 to 1/X2 the diameter of each of the optical fibers of the first assembly, and the height of the projections from the recesses is preferably 1/Y1 to 1/Y2 the diameter of each of the optical fibers of the first assembly.

In the manufacture of the fiber optics device of the present invention, the recesses and projections of the second end face of the first assembly are suitably formed by abrasion.

Thus, small recesses and projections are formed on the exit surface of the first assembly easily and uniformly.

In the fiber optics device of the present invention, the first end face of the second assembly can have an area different from that of the second end face of the second assembly.

In this case, since the incident and exit surfaces of the second assembly described above are formed to have different sizes, an image incident on the incident surface of the first assembly can be reduced or enlarged. As a result, light to be incident on an image pickup element or the like can be handled easily.

In the fiber optics device of the present invention, the optical fibers of the first type preferably have cores with a first refractive index which is lower than a second refractive index of cores of the optical fibers of the second type.

In this case, light incident on the optical fibers of the second type is not totally reflected, and light emerging from the first assembly is guided to the second assembly efficiently.

In this case, the first end face of the second assembly and the second end face of the first assembly can be suitably adhered to each other with an adhesive having a third refractive index higher than the first refractive index and lower than the second refractive index.

Upon incidence of light emerging from the first assembly on the adhesive and incidence of light emerging from the adhesive on the second assembly, the reflection amount is suppressed.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIGS. 5 and 6 are overall schematic views of a fiber optics device;

FIG. 7 is an enlarged sectional view of the exit surface of the first assembly;

DESCRIPTION OF THE PREFERRED EMBODIMENTS

Figure 1:
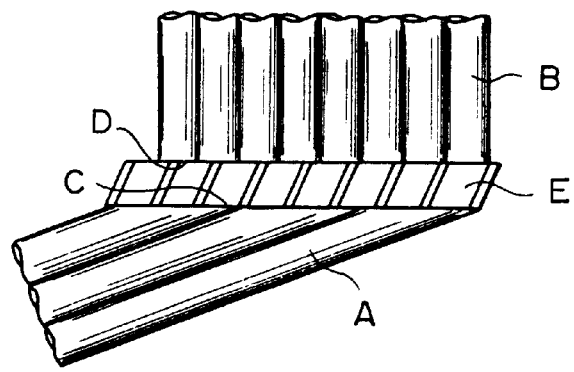
FIGS. 1 to 4 are views for explaining conventional fiber optics assembly assemblies.
Figure 2:
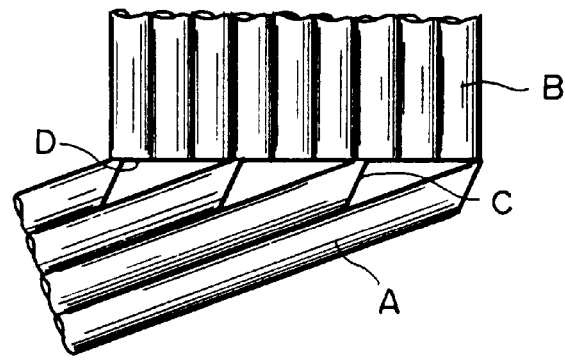
Figure 3:
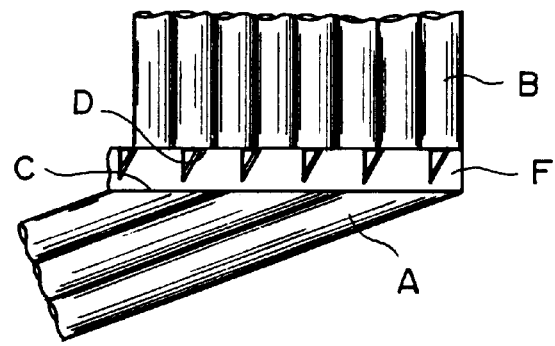
Figure 4:
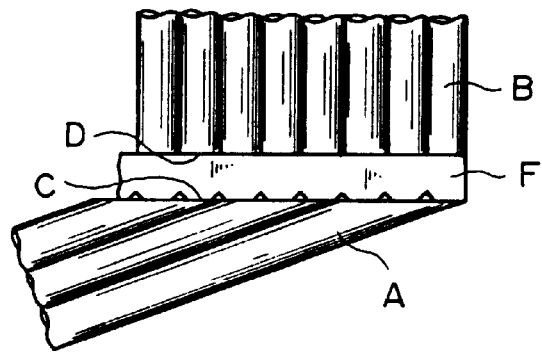

Fiber optics assemblies according to the various embodiments of the present invention will be described with reference to the accompanying drawings. In the drawings, the identical elements are denoted by the same reference numerals, and a repetitive explanation will be omitted.

First Embodiment

Figure 5:
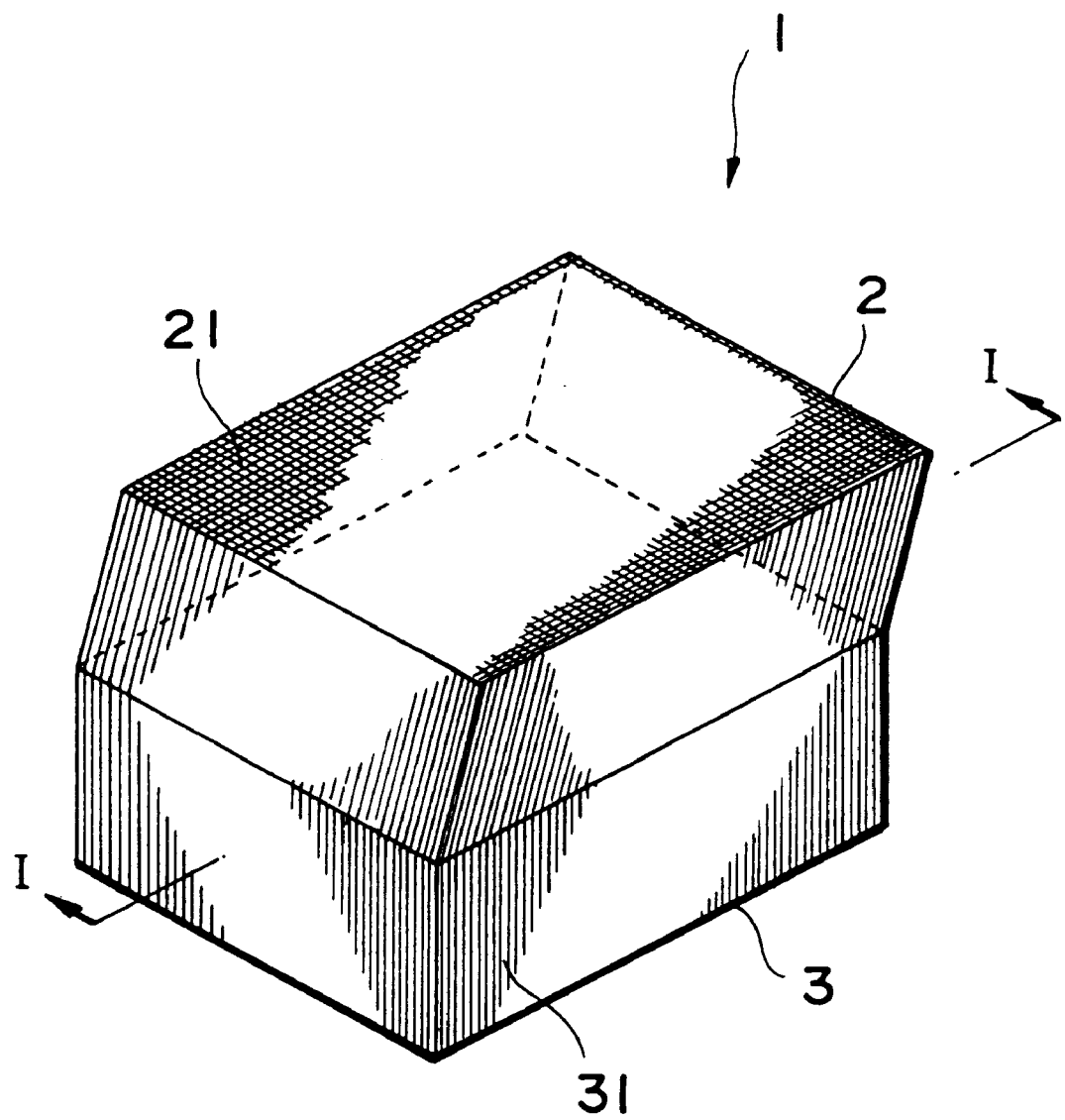

FIGS. 5 and 6 are schematic views of a fiber optics device 1. As shown in FIGS. 5 and 6, the fiber optics device 1 is constituted by bonding a first assembly 2 and a second assembly 3. The first assembly 2 is obtained by integrating, by bundling, a plurality of optical fibers 21 directed in the same direction, and has surfaces 22 and 23 formed obliquely to the direction of an optical axis of the optical fibers 21. The surfaces 22 and 23 of the first assembly 2 are formed parallel to each other, and an inclination angle $\theta_1$ formed by the surface 22 or 23 and the direction of the optical axis of the optical fibers 21 is smaller than 90°. In each optical fiber 21 as the constituent element of the first assembly 2, a cladding layer 21b is formed on a core 21a. More specifically, the refractive index of the core 21a is set to be larger than that of the cladding layer 21b, so that light can be guided along the core 21a. Absorbers 21c are disposed among the optical fibers 21. Therefore, light received by the optical fibers 21 will not leak to the adjacent optical fibers 21.

As shown in FIG. 7, the surface 23 of the first assembly 2 is a surface to be bonded to a surface 32 of the second assembly 3, and has small recesses and projections to scatter light emerging from the surface 32. The surface having small recesses and projections is a surface having recesses and projections sufficiently smaller than the diameter of each optical fiber. For example, when the diameter of the optical fiber 21 is 6 $\mu$m to 25 $\mu$m, the pitch of the recesses and projections and a height difference between the recesses and projections on the surface 23 is about several $\mu$m or sub $\mu$m. Concretely, when the diameter of the optical fiber is 6 $\mu$m, the projection Ra may be 1.09, 0.49 or 0.31 $\mu$m. This value is determined by the relative relationship with respect to the diameter of the optical fiber 21. In this manner, when the surface 23 of the first assembly 2 has small recesses and projections with respect to the diameter of the optical fiber 21, light emerging from the surface 23 is scattered in various directions. As a method of forming the surface 23 to have the recesses and projections, abrasion using desired emery paper or file is employed. If the surface 23 is formed to have recesses and projections by abrasion, formation of a surface having recesses and projections can be performed easily. Also, the recesses and projections can be uniformly formed on the entire surface of the surface 23.

As shown in FIG. 6, the second assembly 3 is obtained by integrating, by bundling, the plurality of optical fibers 31 directed in the same direction, and has the surface 32 and a surface 33 that are substantially perpendicular to the direction of the optical axis of the optical fibers 31. In each optical fiber 31 serving as the constituent element of the second assembly 3, a cladding layer 31b is formed on a core 31a, in the same manner as in the optical fiber 21 described above. The refractive index of the core 31a is set to be larger than that of the cladding layer 31b, so that light can be guided along the core 31a. Absorbers 31c are disposed among the optical fibers 31. Thus, light received by the optical fibers 31 will not leak to the adjacent optical fibers 31. The refractive index of the cores 31a of the second assembly 3 is preferably larger than that of the cores 21a of the first assembly 2. More specifically, when guiding light from the first assembly 2 to the second assembly 3, if the refractive indices are set in this manner, reflection of light by the surface 32 of the second assembly 3 is prevented.

The first assembly 2 and the second assembly 3 are bonded to each other to maintain scattering of light emerging from the surface 23 of the first assembly 2. For example, the surface 23 of the first assembly 2 and the surface 32 of the second assembly 3 are bonded to each other with pressure without interposing an adhesive or the like between the first assembly 2 and the second assembly 3. In this case, scattered light emerges from the surface 23 of the first assembly 2, and is incident on the surface 32 of the second assembly 3 with its reflection being suppressed by the surface 32. Therefore, an optical output from the surface 33 of the second assembly 3 becomes large. Sometimes the first assembly 2 and the second assembly 3 are bonded to each other through an adhesive. In this case, it is necessary to use, as the adhesive, one having a refractive index between that of the cores 21a of the optical fibers 21 of the first assembly 2 and that of the cores 31a of the optical fibers 31 of the second assembly 3. If the adhesive having such a refractive index is used, when light is incident on this adhesive from the first assembly 2 or is incident on the second assembly 3 from this adhesive, reflection of light is suppressed by the incident surface of the adhesive or the incident surface of the second assembly 3.

The light-guiding function of the fiber optics device 1 will be described.

Figure 8:
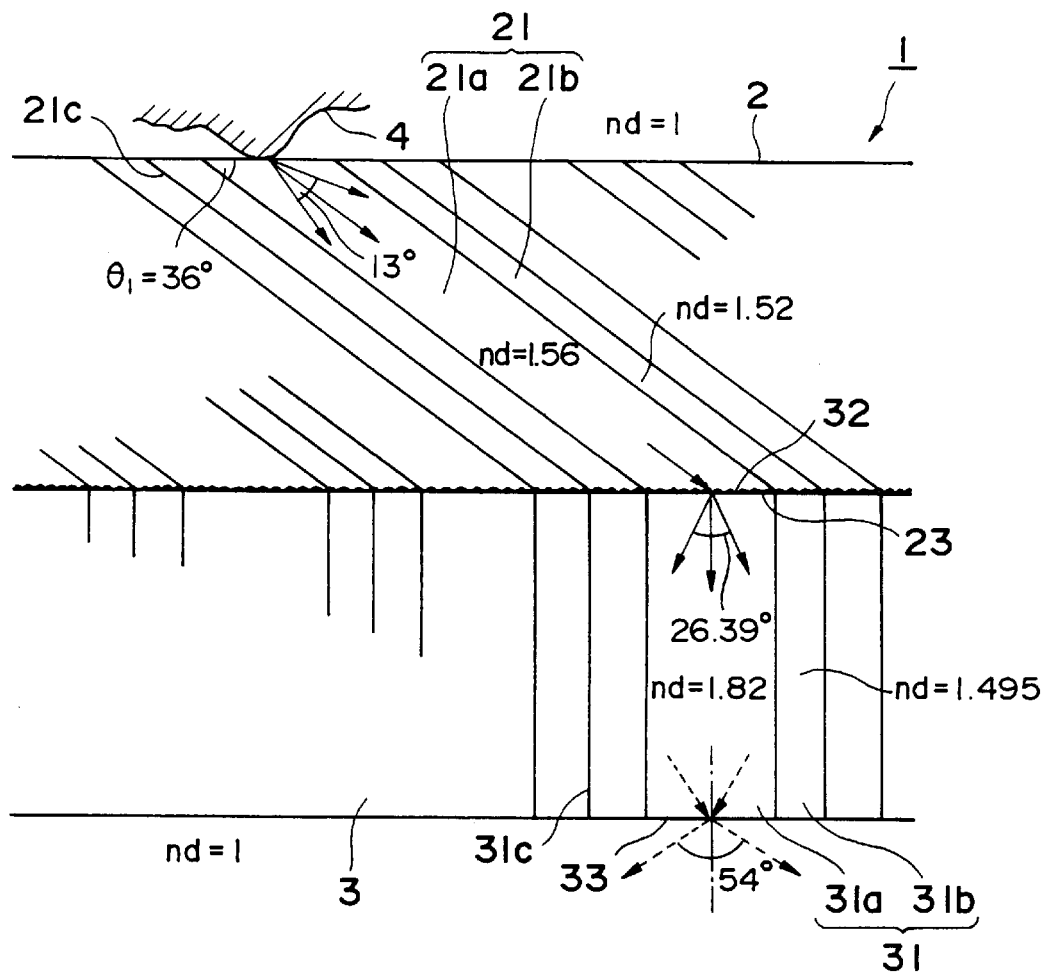
FIG. 8 is a view for explaining the light-guiding function of the fiber optics device.

As shown in FIG. 8, as the fiber optics device 1, one in which the inclination angle $\theta_1$ of the first assembly 2 is 36°, the refractive indices of the cores 21a and the cladding layers 21b of the first assembly 2 are 1.56 and 1.52, respectively, and the refractive indices of the cores 31a and the cladding layers 31b of the second assembly 3 are 1.82 and 1.495, respectively, is used. In order to prevent light from becoming incident into the surface 22 from the ambient outer air portion, the inclination angle $\theta_1$ of the first assembly 2 must be determined in accordance with the refractive index of the cores 21a of the first assembly 2 and the like. For example, if the refractive index of the cores 21a of the first assembly 2 is 1.56 and the refractive index of the outer air is 1, from the Snell's law, the inclination angle $\theta_1$ is set to a value smaller than 37.1°.

In this fiber optics device 1, when a transparent material 4 comes in contact with the surface 22 of the first assembly 2, as shown in FIG. 8, light is incident into the core 21a of the corresponding optical fiber 21 from this contact portion through the transparent material 4. Of this light, only light components that are incident at predetermined angles are guided along the optical fiber 21. More specifically, as the refractive indices of the cores 21a and the cladding layers 21b are 1.56 and 1.52, respectively, only light components that propagate at angles of about 13° or less with respect to the optical axis of the optical fiber 21 are guided along the optical fiber 21. Light components guided in the optical fiber 21 emerge from the first assembly 2 through the surface 23. Even if the surface 23 is oblique to the optical axis of the optical fibers 21, it has small recesses and projections, so that light components that have reached the surface 23 are scattered by it and emerge. The exit light components are incident into the optical fiber 31 from the surface 32 of the second assembly 3. Since the recesses and projections of the surface 23 are small when compared to the diameter of the optical fiber 21, light components scattered by and emerging from the surface 23 will not become incident on the surrounding adjacent optical fibers 31. As a result, if light incident on the first assembly 2 forms a two-dimensional image, this image is transmitted to the second assembly 3 without getting blurred.

Light incident on the second assembly 3 propagates along the core 31a. At this time, only light components that are incident at predetermined incident angles (only light components that are incident at angles of 26.33° or less with respect to the optical axis of the optical fibers 31) are guided along the optical fiber 31, in the same manner as the light guided in the first assembly 2. The light components that have reached the surface 33 emerge at a wide angle (54°) of field from the surface 33.

As described above, in this fiber optics device 1, since the surface 23 of the first assembly 2 has small recesses and projections, light incident on the surface 22 emerges from the surface 23 and becomes incident on the optical fibers 31 from the surface 32 of the second assembly 3 efficiently. Therefore, an optical loss at the bonding portion between the first assembly 2 and the second assembly 3 is decreased, so that light incident on the first assembly 2 can emerge from the second assembly 3 efficiently.

Second Embodiment

Figure 9:
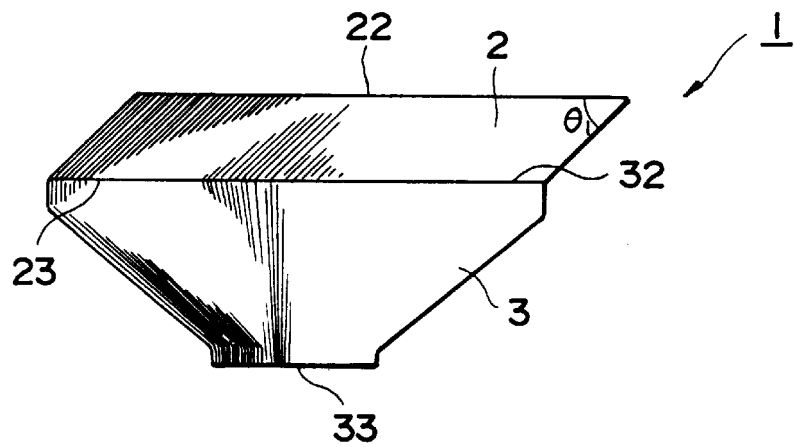
FIG. 9 is a view for explaining a fiber optics device according to the second embodiment.

In the fiber optics device 1 described above, the surface 33 of the second assembly 3 can have an area smaller than that of the surface 32. More specifically, as shown in FIG. 9, a surface 23 of a first assembly 2 and a surface 32 of a second assembly 3 may be formed to have areas substantially equal to each other, and a surface 33 of the second assembly 3 may be formed to have an area smaller than that of the surface 32, so that an image incident on the surface 22 of the first assembly 2 is reduced and emerges from the surface 33 of the second assembly 3. In this case, if the reduction ratio of the surface 33 to the surface 32 in the second assembly 3 is changed as required, the optical (image) input surface having different sizes of various apparatuses can be reliably coped with.

Third Embodiment

Figure 10:
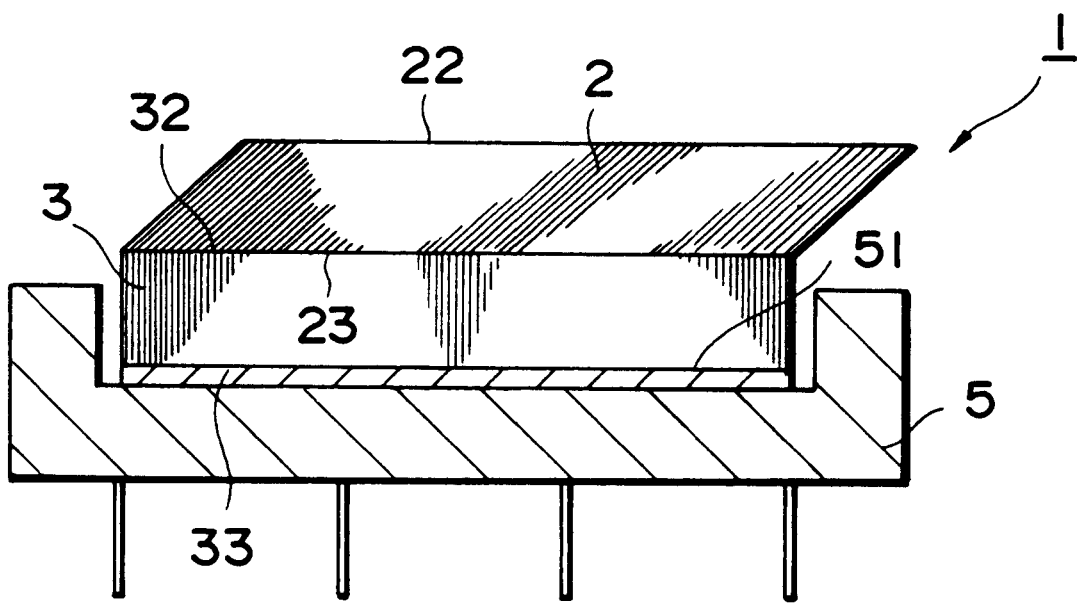
FIG. 10 is a view for explaining a fiber optics device according to the third embodiment.

In the fiber optics device 1 of the first or second embodiment described above, an image pickup element may be bonded to the surface 33 of the second assembly 3. For example, as shown in FIG. 10, if a surface 33 of a fiber optics device 1 is bonded to a light-receiving surface 51 of an image pickup element 5, e.g., a CCD, light incident on a surface 22 can become directly incident on the image pickup element 5 through the surface 33. In this manner, when the fiber optics device 1, an image can become incident on the image pickup element 5 through the fiber optics device 1 clearly.

The surface 33 of the fiber optics device 1 and the light-receiving surface 51 of the image pickup element 5 may be bonded to each other by adhesion using an adhesive or the like. In this adhesion, since the side wall of a second assembly 3 of the fiber optics device 1 is substantially perpendicular to the surface 33, the fiber optics device 1 can be mounted on the image pickup element 5 even if the light-receiving surface 51 of the image pickup element 5 is arranged on a recessed surface, as shown in FIG. 10.

With the fiber optics device 1 as shown in FIG. 9, even if the light-receiving surface 51 of the image pickup element 5 is small, an image can become reliably incident on the image pickup element 5 by using the fiber optics device 1 having a second assembly 3 matching the light-receiving surface 51.

As has been described above, according to the present invention, the following effects can be obtained.

Since the surface of the first assembly to be bonded to the second assembly has small recesses and projections, light incident on the first assembly and emerging from the exit surface can become efficiently incident on the second assembly. As a result, an optical loss at the bonding portion between the first and second assemblys can be decreased, so that light which is incident on the first assembly to form an image can emerge from the second assembly as a clear image.

Since an intermediate member for optically coupling the first and second assemblies need not be disposed between them, the thickness of the entire device can be decreased.

Since the exit surface of the first assembly is formed with small recesses and projections by abrasion, the recesses and projections on this exit surface can be formed easily and uniformly. As a result, an image free from distortion can be transmitted reliably.

When the incident surface and the exit surface of the second assembly are formed to have different sizes, an image incident on the incident surface of the first assembly can emerge from the exit surface of the second assembly through reduction or enlargement.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

The basic Japanese Application No.8-100156 (100156/1996) filed on Apr. 22, 1996 is hereby incorporated by reference.

What is claimed is:

1. A fiber optics device comprising:
a first assembly having a first end face and a second end face obliquely intersecting an image transmitting direction, comprising:
a plurality of co-axially aligned optical fibers of a first type together as a unit, each of said plurality of optical fibers having a core and a cladding, said core and said cladding in said second end face of said first assembly having a plurality of recesses and projections, a pitch of said recesses and projections and a height of said projections from said recesses being smaller than a diameter of each of said optical fibers of said first assembly; and
a second assembly having a first end face and a second end face, said first end face of said second assembly being bonded to said second end face of said first assembly, comprising:
a plurality of co-axially aligned optical fibers of a second type together as a unit, each of said plurality of optical fibers having a core and a cladding.

2. A fiber optics device according to claim 1, wherein said first end face of said first assembly is substantially parallel to said second end face of said first assembly.

3. A fiber optics device according to claim 1, wherein said recesses and projections are formed by abrading said second end face of said first assembly.

4. A fiber optics device according to claim 1, wherein said first end face of said second assembly has an area different from that of said second end face of said second assembly.

5. A fiber optics device according to claim 1, wherein regions at a bonding portion between said first end face of said second assembly and said second end face of said first assembly and corresponding to said recesses of said second end face of said first assembly are filled with air.

6. A fiber optics device according to claim 1, wherein said optical fibers of the first type have cores with a first refractive index which is lower than a second refractive index of cores of said optical fibers of the second type.

7. A fiber optics device according to claim 6, further comprising an adhesive, having a refractive index higher than the first refractive index and lower than the second refractive index, between said first end face of said second assembly and said second end face of said first assembly.

8. A fiber optics device according to claim 1, wherein said first end face and said second end face of said second assembly is substantially perpendicular to the image transmitting direction.

9. A fiber optics device according to claim 1, further comprising:
    an absorber disposed between said optical fibers of said first assembly and said second assembly for inhibiting light received by said optical fibers of said first assembly and said second assembly from leaking to adjacent optical fibers.

* * * * *